United States Patent
Ballou et al.

(10) Patent No.: US 9,061,831 B1
(45) Date of Patent: Jun. 23, 2015

(54) CONVEYOR BELT ALIGNING APPARATUS

(71) Applicant: Precision, Inc., Pella, IA (US)

(72) Inventors: Mark Ballou, Otley, IA (US); Matthew Roozeboom, Pella, IA (US); Tim Wolf, Pella, IA (US)

(73) Assignee: Precision, Inc., Pella, IA (US)

( * ) Notice: Subject to any disclaimer, the term of this patent is extended or adjusted under 35 U.S.C. 154(b) by 0 days.

(21) Appl. No.: 14/132,602

(22) Filed: Dec. 18, 2013

(51) Int. Cl.
*B65G 39/16* (2006.01)
*B65G 15/64* (2006.01)
*B65G 23/04* (2006.01)

(52) U.S. Cl.
CPC ............. *B65G 15/64* (2013.01); *B65G 23/04* (2013.01)

(58) Field of Classification Search
USPC ............................. 198/806, 807, 808, 810.03
See application file for complete search history.

(56) References Cited

U.S. PATENT DOCUMENTS

| | | | |
|---|---|---|---|
| 2,132,052 A | 10/1938 | Sollenberger | |
| 2,132,053 A | 10/1938 | Sollenberger et al. | |
| 3,038,588 A | 6/1962 | Arndt et al. | |
| 3,056,578 A | 10/1962 | Auger | |
| 3,058,573 A | 10/1962 | Lo Presti | |
| 3,066,547 A | 12/1962 | Evans et al. | |
| 3,187,881 A | 6/1965 | Clark | |
| 3,368,665 A | 2/1968 | Jinkins | |
| 3,496,619 A | 2/1970 | Constant | |
| 3,545,599 A * | 12/1970 | Barber et al. | 198/807 |
| 3,777,878 A | 12/1973 | Morrison | |
| 3,946,619 A | 3/1976 | Needles et al. | |
| 4,072,611 A | 2/1978 | Davis | |
| 4,092,914 A | 6/1978 | Burrough et al. | |
| 4,231,161 A | 11/1980 | Belfiore | |
| 4,527,440 A | 7/1985 | Heitman et al. | |
| 4,693,363 A | 9/1987 | Kuehnert | |
| 4,765,455 A | 8/1988 | Matsuno et al. | |
| 5,117,969 A | 6/1992 | Roth | |
| 5,358,098 A * | 10/1994 | Sundstrom et al. | 198/806 |
| 5,394,222 A * | 2/1995 | Genovese | 399/167 |
| 5,609,241 A * | 3/1997 | Shaw | 198/806 |
| 5,743,378 A * | 4/1998 | Hovst.o slashed. et al. | 198/806 |
| 6,116,410 A * | 9/2000 | Malmberg | 198/806 |
| 6,131,726 A | 10/2000 | Hovsto et al. | |
| 6,186,317 B1 * | 2/2001 | Hovsto et al. | 198/806 |
| 6,431,348 B2 * | 8/2002 | Malmberg | 198/806 |
| 6,520,717 B1 | 2/2003 | Otto et al. | |
| 6,634,490 B2 | 10/2003 | Fischer et al. | |
| 7,051,867 B2 | 5/2006 | Sharp | |
| 7,374,072 B2 * | 5/2008 | Irwin | 226/21 |
| 7,686,157 B2 * | 3/2010 | Murayama | 198/806 |
| 7,761,045 B2 * | 7/2010 | Fujimori et al. | 399/329 |
| 8,376,127 B2 | 2/2013 | Sharp | |
| 8,474,604 B2 * | 7/2013 | Khanania | 198/806 |
| 8,556,068 B2 * | 10/2013 | DeVries | 198/807 |
| 8,800,755 B2 * | 8/2014 | Sharp | 198/806 |
| 2004/0079621 A1 | 4/2004 | Mott | |

* cited by examiner

*Primary Examiner* — Douglas Hess
(74) *Attorney, Agent, or Firm* — Armstrong Teasdale LLP (57) ABSTRACT

Apparatus for aligning a conveyor belt by engaging the conveyor belt upon misalignment of the conveyor belt during conveying operations.

21 Claims, 9 Drawing Sheets

CONVEYOR BELT ALIGNING APPARATUS

FIELD OF THE DISCLOSURE

The field of the disclosure relates to apparatus for aligning a conveyor belt and, particularly, apparatus that engage the conveyor belt upon misalignment of the conveyor belt during conveying operations.

BACKGROUND

During mining and other bulk transport operations material must be transported over long distances in order to load the material by truck or rail. Further, such material must be unloaded and transported for processing. Among the common transport mechanisms are bulk conveyors which are capable of transporting large amounts of material quickly and reliably and without significant cost. Typical conveyors include drag, screw, belt and pneumatic conveyors.

Belt conveyors are well suited for use in many transport applications and are particularly well suited for use in mining operations. Belt conveying systems include at least two pulleys and a conveyor belt which rotates about the two pulleys. Material is loaded onto the belt at a tail section and is unloaded via gravity at a head section. A tail pulley and head pulley allow the belt to travel from the point at which material is loaded to the point it is unloaded and back again. The conveying system may also include take-up pulleys to provide proper belt tensioning, bend pulleys to change the direction of travel of the belt and snub pulleys, typically located adjacent the drive pulley, to increase the contact with the drive pulley and/or provide belt tensioning. The belt may be driven at a number of positions including the tail section or head section of the conveyor system.

During operation of the conveyor system, the conveyor belt may become laterally misaligned due to uneven material loading, warped belting, a poorly aligned or unlevel framework or due to wind. Such misalignment may cause premature wearing of the belt or damage to the framework, friction induced fire or may cause material spillage. A better aligning apparatus for aligning conveyor belts during conveying operations is needed.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to an apparatus for aligning a conveyor belt during rotation of the conveyor belt. The apparatus includes a shaft having a first end, a second end and a central axis extending from the first end to the second end. The apparatus includes a first mounting assembly and a second mounting assembly. The first end of the shaft is attached to the first mounting assembly and the second end is attached to the second mounting assembly. The shaft is fixed axially relative to the first and second mounting assemblies. The apparatus includes a first pivot bracket and a second pivot bracket. The first mounting assembly is pivotally connected to the first pivot bracket and the second mounting assembly is pivotally connected to the second pivot bracket. The apparatus also includes a first guide roller and a second guide roller for engaging the conveyor belt upon misalignment of the conveyor belt. The first guide roller is attached to the first pivot bracket and the second guide roller is attached to the second pivot bracket.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
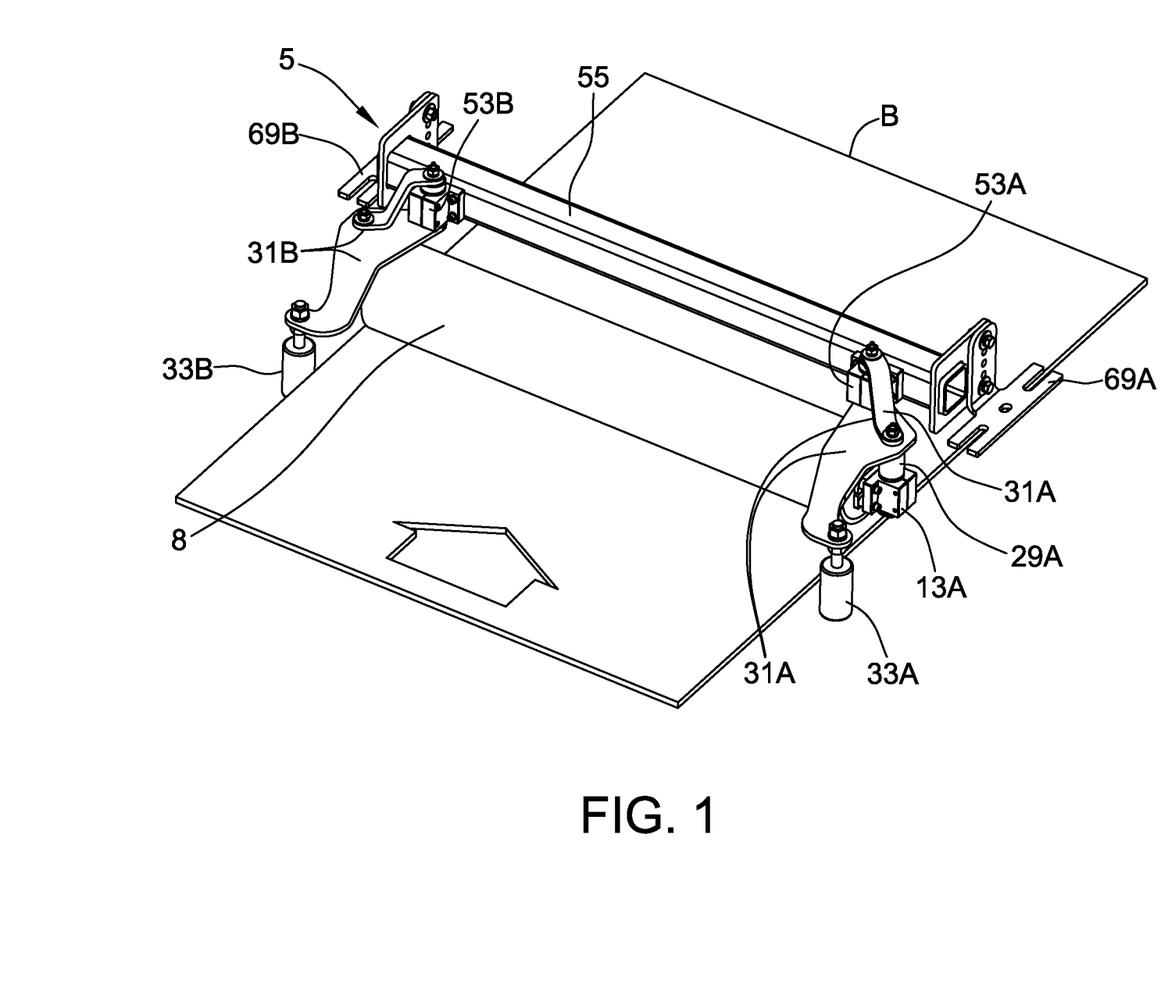
FIG. 1 is a perspective view of a conveyor belt and an apparatus for aligning a conveyor belt.
Figure 2:
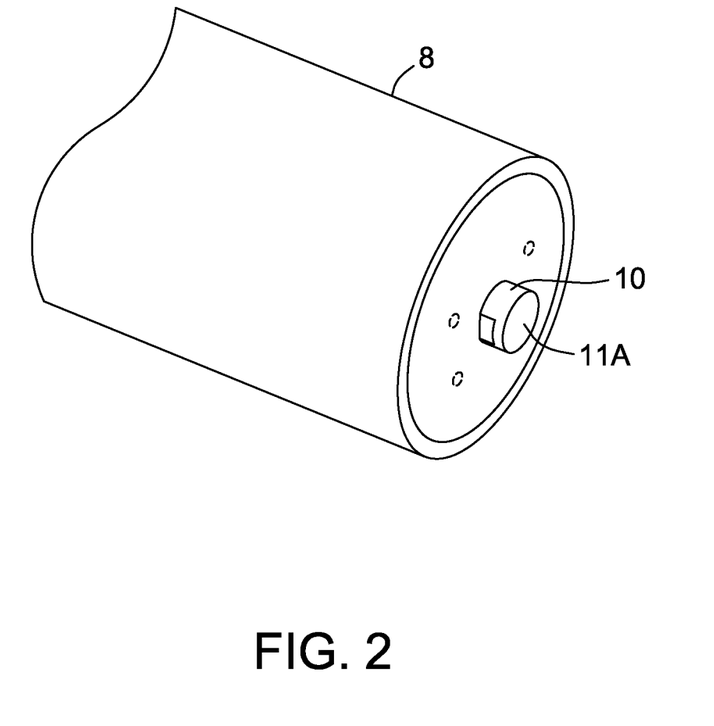
FIG. 2 is a perspective view of a shaft and roller of the apparatus.

An embodiment of an apparatus for aligning a conveyor belt B during operation of the conveying system is generally referred to as "5" in FIG. 1. The belt B is illustrated to show use of the apparatus 5 and does not form part of the apparatus 5. The apparatus 5 includes a roller 8 which engages the conveyor belt B. A shaft 10 (FIG. 2) extends through the roller 8 and the roller rotates about the shaft. The roller 8 extends the entire width of the conveyor belt B. The roller 8 may extend less the entire width of the conveyor belt and/or a plurality of rollers which rotate about the shaft 10 may be used. The shaft 10 has two ends with the first end 11A being shown in FIG. 2.

The apparatus 5 is generally symmetrical in that several components have a corresponding component with the same function opposite the component (i.e., across the belt). Corresponding components of the pair may be indicated herein by use of a reference number followed by "A" and "B" any may be referred to as a "first" component and a "second" component, respectively. While the apparatus 5 may be described herein with reference to the components of one side of the apparatus 5, any component designated by "A" or "B" herein or in FIGS. 1-9 includes a corresponding component with the same function opposite the component.

Figure 3:
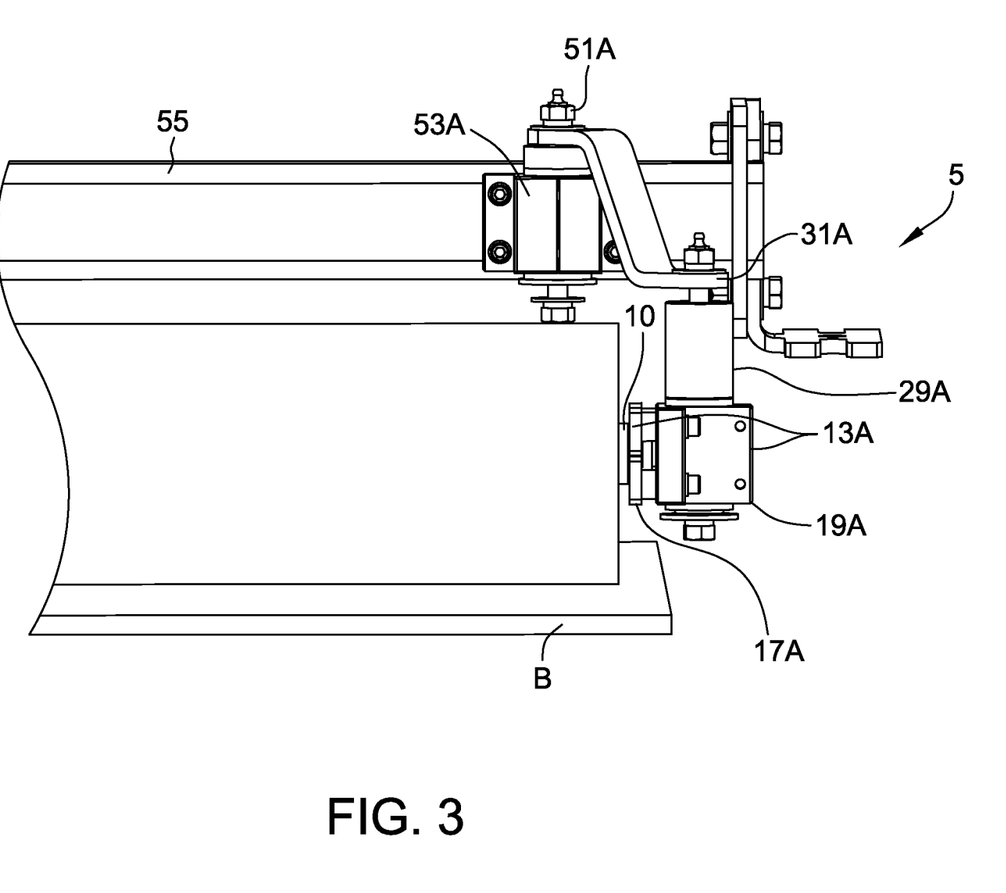
FIG. 3 is a front view of a first end of the apparatus and a conveyor belt.
Figure 4:
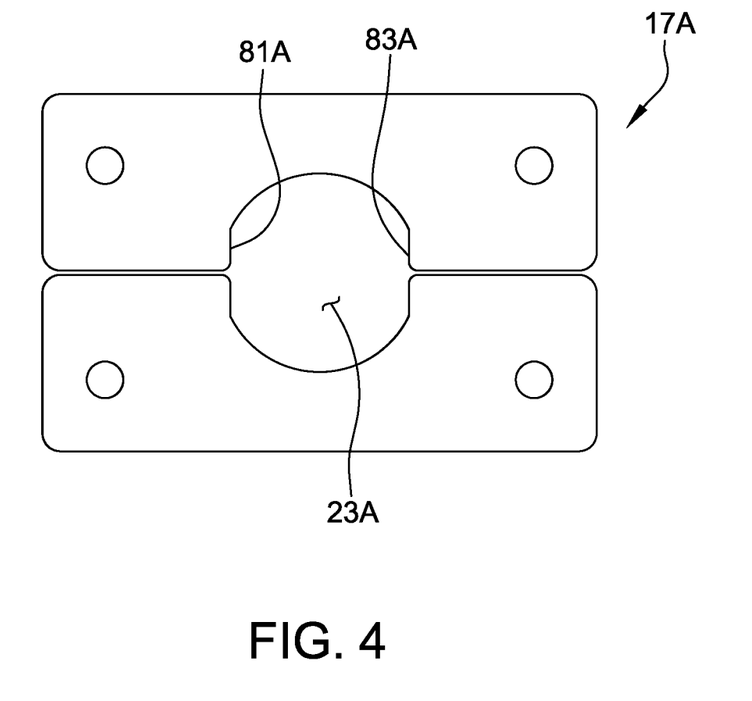
FIG. 4 is a side view of a face plate of a mounting assembly of the apparatus.

Referring now to FIG. 3 (the first pivot bracket not shown), the shaft 10 extends into a first mounting assembly 13A at the first end of the shaft. The first mounting assembly 13A includes a main housing 19A and a face plate 17A attached to the main housing. The face plate 17A includes a first mounting assembly opening 23A (FIG. 4) through which the shaft 10 extends. The shaft 10 (FIG. 5) has a central axis A that extends from the first end 11A to the second end of the shaft.

Figure 5:
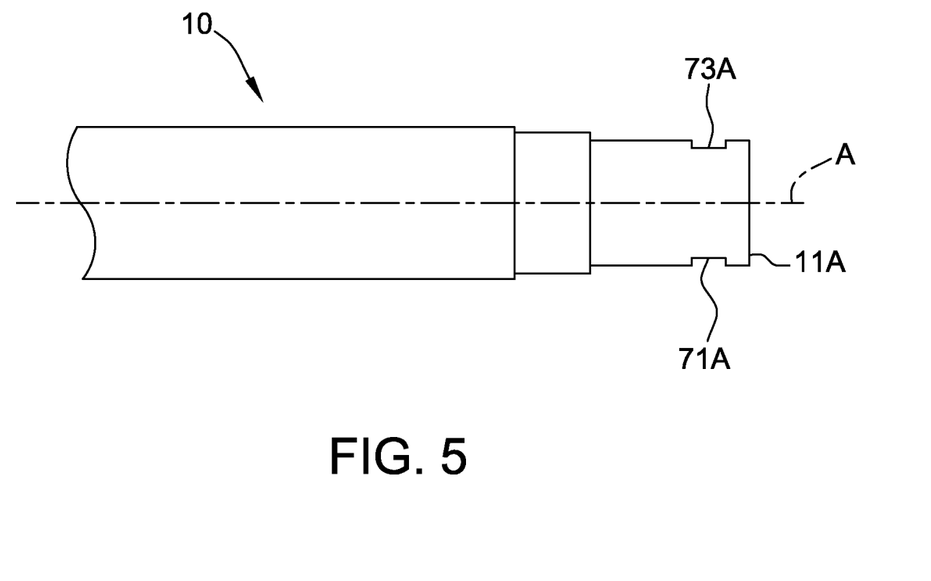
FIG. 5 is a front view of a shaft of the apparatus.

The shaft 10 includes a number of portions having different diameters. However, the shaft may also be uniform in diameter across its length.

The apparatus 5 may be configured to limit axial movement of the shaft. As shown in FIG. 5, the first side 11A of the shaft 10 includes two detents 71A, 73A. The second side of the shaft 10 also includes two detents (not shown). The width of the detents 71A, 73A is substantially the same as the width of the first face plate 17A (FIG. 4) such that the front and back faces of the face plate abut the walls of the detent. By abutting the face plate 17A against one or both walls of the detent, lateral movement of the shaft 10 (i.e., movement in the axial direction of the shaft) relative to the first and second mounting assemblies may be prevented.

The apparatus 5 may include other arrangements to limit axial movement of the shaft. For example, one or both mounting assemblies 13A, 13B may abut portions of the shaft with increased diameters or the shaft may be secured by one or more pins that extend through the shaft.

The apparatus 5 may also be configured to limit rotational movement of the shaft. The detents 71A, 73A (FIG. 4) of the first side 11A of the shaft generally align with linear portions 81A, 83A of the first mounting assembly opening 23A of the first face plate 17A. Similar linear portions (not shown) are included in the second face plate (not shown). The detents and linear portions of the openings limit rotational movement of the shaft 10.

Figure 6:
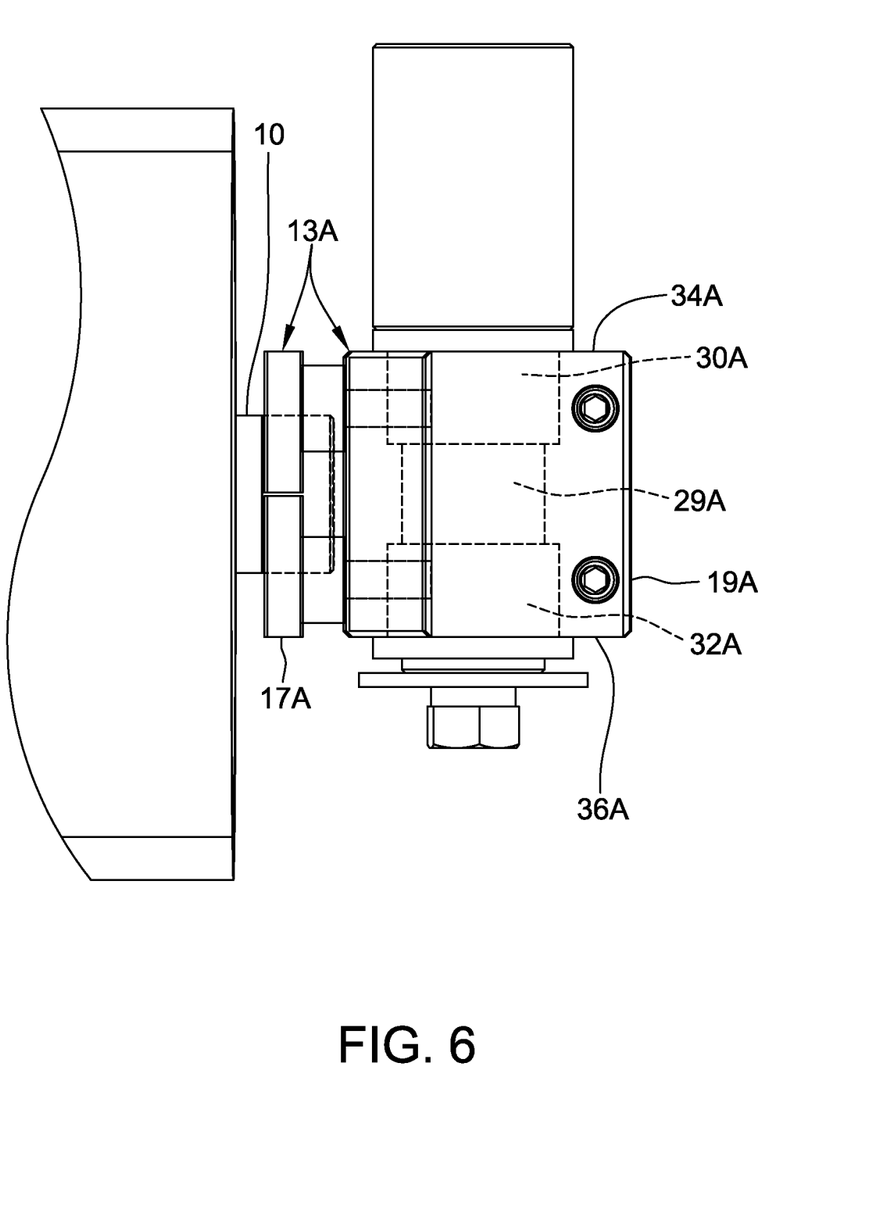
FIG. 6 is a front view of a first mounting assembly and pin.

Referring now to FIG. 6 (the main housing being transparent), the apparatus 5 includes a first pin 29A that extends through the main housing 19A of the first mounting assembly and a second pin (not shown) that extends through the main housing of the second mounting assembly. The first and second pins are generally orthogonal to the shaft 10. The first mounting assembly 13A includes a first mounting assembly upper bushing 30A and a first mounting assembly lower bushing 32A. The first pin 29A extends into and through the main housing 19A of the first mounting assembly 13A. The pin 29A extends entirely through the main housing 19A of the first mounting assembly 13A (i.e., extends from a top wall 34A to a bottom wall 36A of the main housing 19A). The bushings 30A, 32A allow the first pin 29A to rotate relative to the main housing 19A of the first mounting assembly 13A.

The apparatus 5 includes a first pivot bracket 31A (FIG. 1) and second pivot bracket 31B. First and second guide rollers 33A, 33B are attached to the pivot brackets 31A, 31B for engaging the conveyor belt upon misalignment of the conveyor belt. The first mounting assembly 13A is pivotally connected to the first pivot bracket by use of pin 29A and bushings 30A, 32A (FIG. 6). The first pin 29A is fixedly attached (i.e., does not pivot) to the first pivot bracket 31A and the second pin (not shown) is fixedly attached to second pivot bracket 31B.

Figure 7:
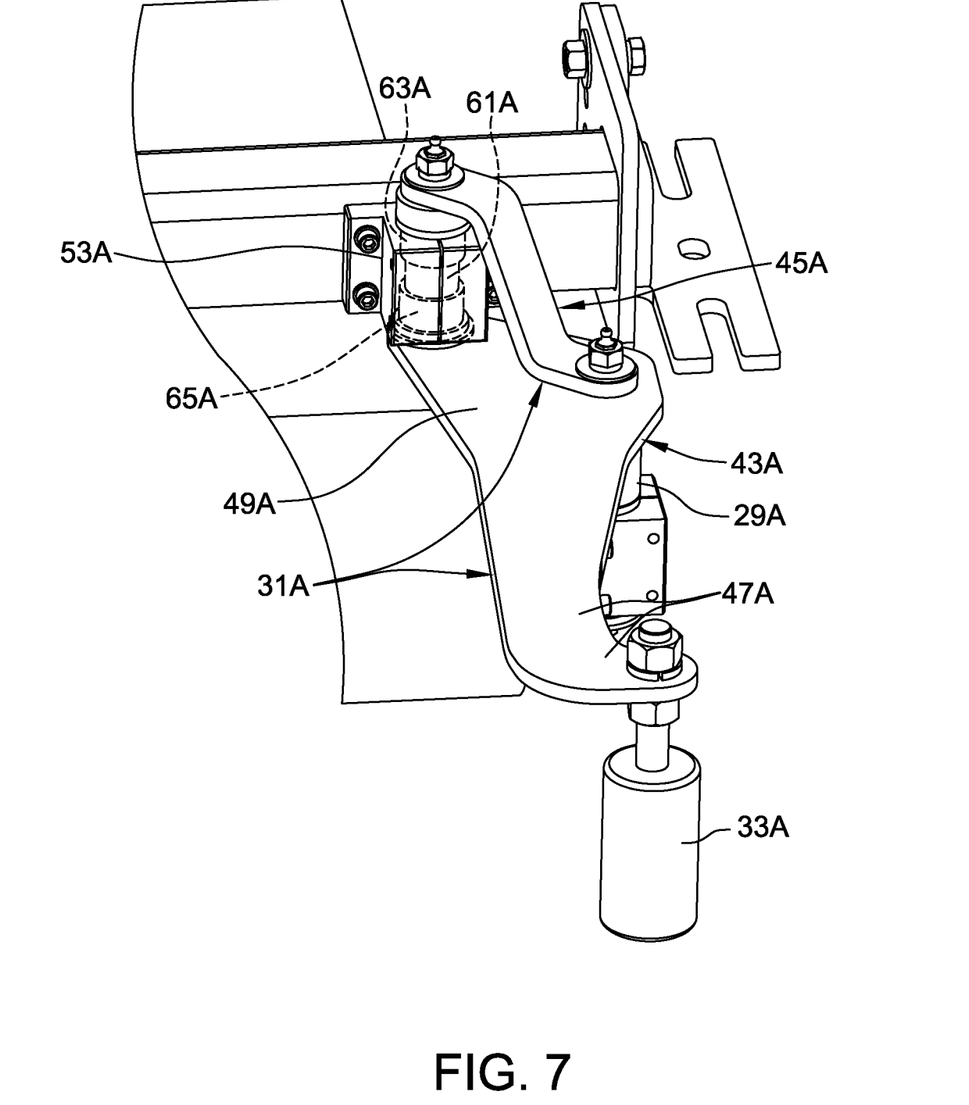
FIG. 7 is a perspective view of a first end of the apparatus.

The first pivot bracket 31A is shown in detail in FIG. 7 (portion of support mount 53A being transparent). The bracket 31A includes a frame 43A and an arm 45A that extends upward from the frame. The frame 43A has a lower portion 47A and an upper portion 49A. The first guide roller 33A attaches to the lower portion 47A of the frame 43A of the first pivot bracket 31A. The first pin 29A is attached to the upper portion 49A of the frame 43A and also is attached to the arm 45A. The frame 43A and arm 45A of the first pivot bracket 31A are attached by a support mount pin 61A. The support mount 53A includes a support mount upper bushing 63A and a support mount lower bushing 65A. The first support mount pin 61A is received in the support mount upper bushing 63A and the support mount lower bushing 65A.

As shown in FIG. 1, the first pivot bracket 31A is pivotally attached to a first support mount 53A. The first support mount 53A and second support mount 53B are attached to a support member 55 that extends above the conveyor belt B. The upper portion 49A of the frame 43A and the arm 45A (FIG. 7) of the first pivot bracket 31A are both pivotally attached to the first support mount 53A. The arm 45A provides strength and rigidity to the pivot bracket 31A and absorbs the contact force between the belt B (FIG. 1) and roller 8. Both the frame 43A and arm 45A bear the vertical load resulting from the contact forces and transmit the load to the pin 61A.

A first frame bracket 69A and a second frame bracket 69B are attached to the support member 55. The first frame bracket 69A and second frame bracket 69B are capable of being attached to the support frame (not shown) of the conveyor belt B for supporting the aligning apparatus 5. The brackets 69A, 69B may attach by use of bolts and bolt holes and a number of bolt holes may be provided to allow the vertical position of the aligning apparatus 5 to be adjusted. Vertical adjustment of the apparatus 5 allows the contact pressure between the belt B and roller 8 to be adjusted.

The first pin 29A (FIG. 1) that extends through mounting assembly 13A and the support mount pin 61A each define a pivot axis about which various components of the apparatus may pivot (i.e., the apparatus 5 includes two axes points at each end of the apparatus).

The first guide roller 33A, first pivot bracket 31A, first mounting assembly 13A, shaft 10 (FIG. 2), second mounting assembly 13B, second pivot bracket 31B and second guide roller 33B form a conveyor belt response chain in which movement of the conveyor belt B causes a response or change in the angle at which the roller 8 engages the conveyor belt B. This response chain is the only connection between the first guide roller 33A and second guide roller 33B (e.g., the apparatus does not include a tie rod connecting the first guide roller 33A to the second guide roller 33B).

During operation of the apparatus 5, a gap between each guide roller 33A, 33B and the belt B is maintained when the belt is properly aligned (e.g., 0.25 inch to 1.5 inch gap). Upon misalignment of the conveyor belt B, the response chain reacts to cause the shaft 10 and roller 8 to angle toward the direction of the misalignment (i.e., the ends of the shaft and roller in the direction the belt has become misaligned move toward the support member 55 while the opposite ends move away from the support member 55) as shown in FIGS. 8 and 9.

Figure 8:
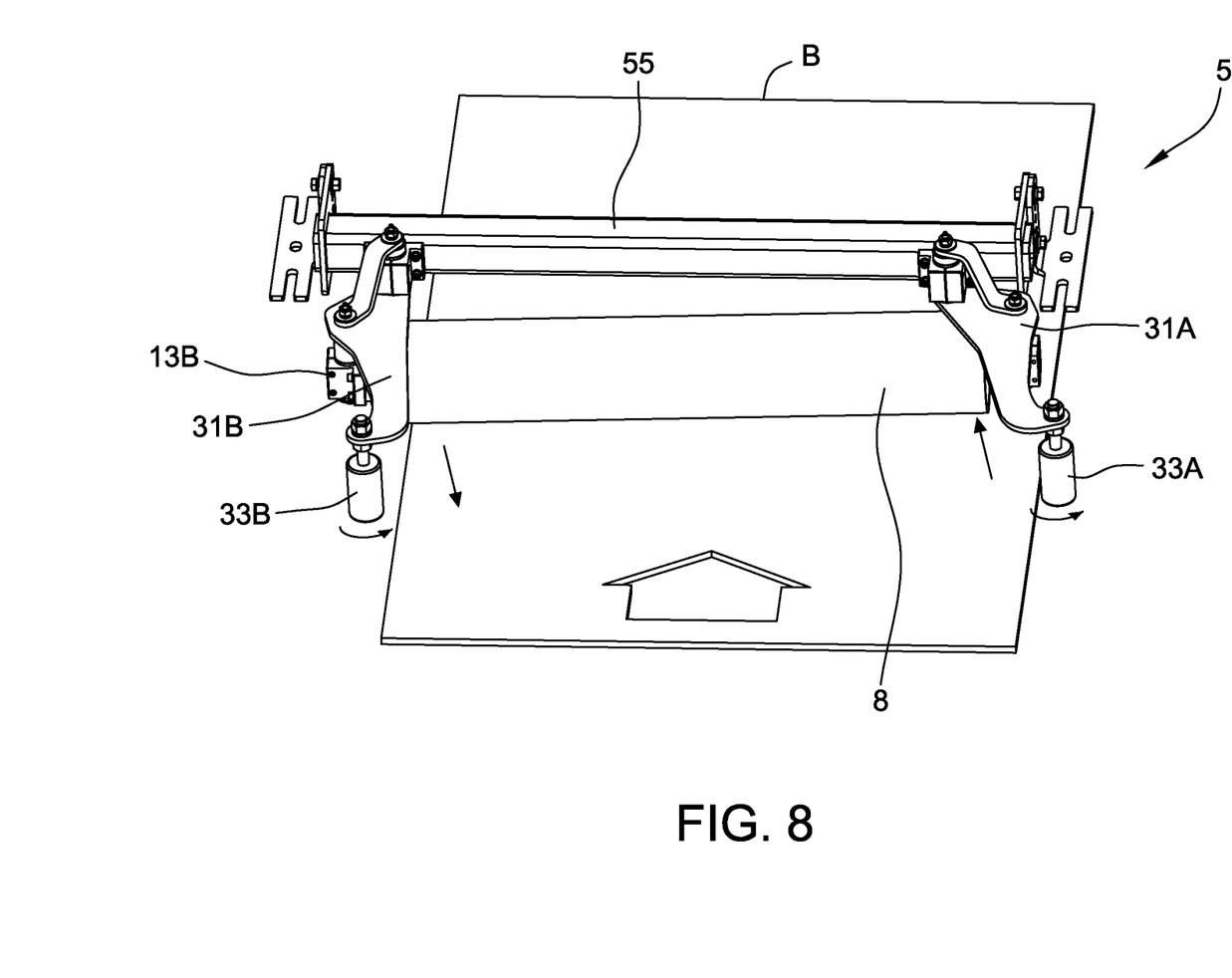
FIG. 8 is a perspective view of the apparatus with the conveyor belt being misaligned to the right.
Figure 9:
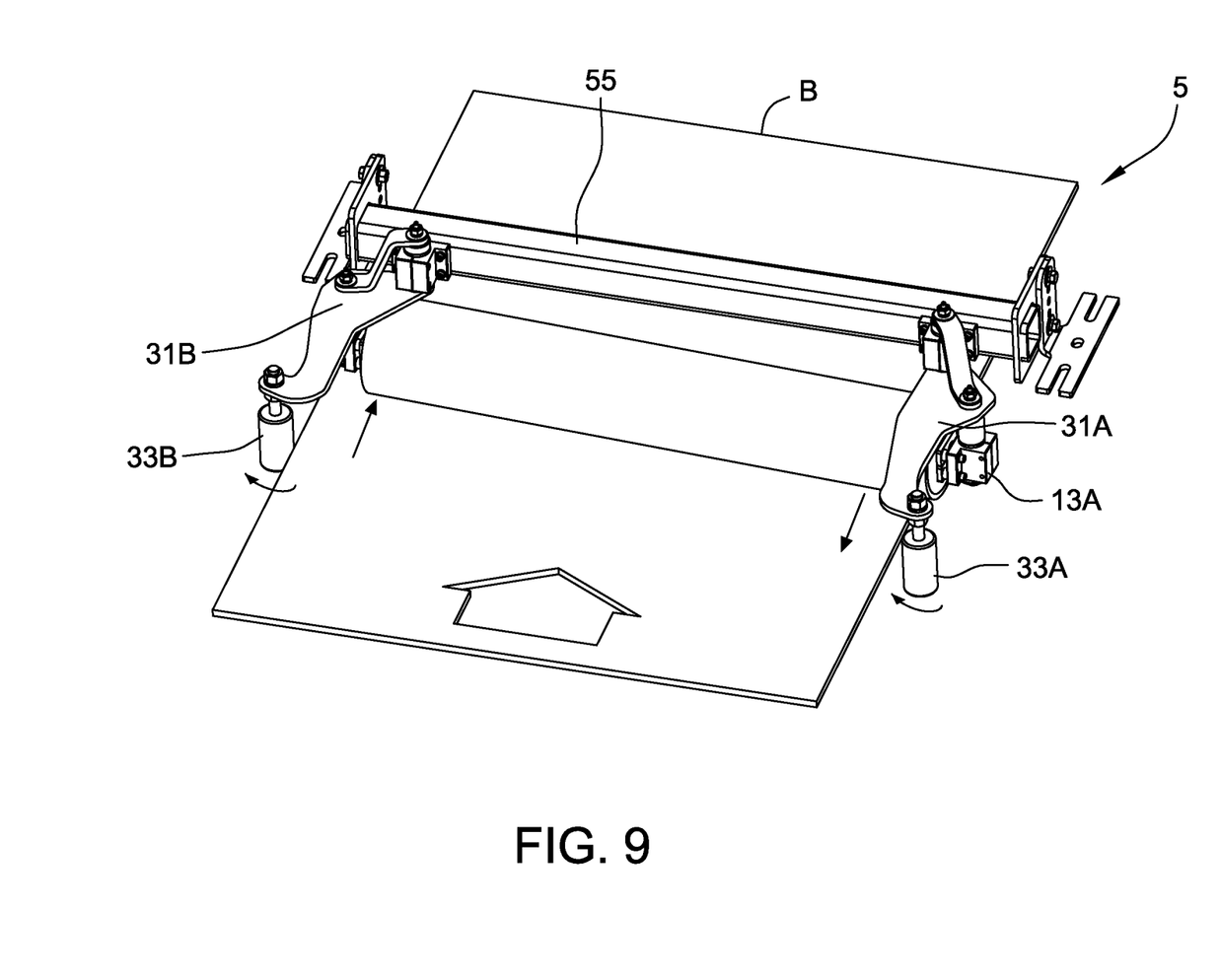
FIG. 9 is a perspective view of the apparatus with the conveyor belt being misaligned to the left.

Referring now to FIG. 8, as the belt B becomes laterally misaligned in the direction of the first guide roller 33A, the belt contacts the guide roller and forces the lower portion 47A (FIG. 7) of the first pivot bracket 31A to rotate in the direction of the misalignment. This movement causes the first pivot bracket 31A, first mounting assembly (not shown) and first guide roller 33A to move in the direction of the support member 55. This in turn causes the first mounting assembly 13A (FIG. 1) to pivot around the first pin 29A that extends through the first mounting assembly and angle the shaft (not shown) and roller 8 toward the direction of the misalignment. Angling of the shaft causes the second mounting assembly 13B, second pivot bracket 31B and second guide roller 33B to pivot toward the direction of the misalignment. By angling the roller 8 into the direction of the misalignment, the guide roller exerts a corrective force against the belt B thereby causing the belt to travel to an aligned position.

Compared to conventional apparatus for aligning conveyor belts, the apparatus 5 described above has at least several advantages. By using a shaft 10 (FIG. 2) that is fixed in the axial direction relative to the mounting assemblies 13A, 13B (FIG. 1), the roller 8 is fixed and directly responds to movement of the guide rollers 33A, 33B. This is in contrast to conventional apparatus in which the roller (or rollers) may slip and loose tracking effect as the belt may push the roller causing the roller and shaft to move laterally. Eliminating axial sliding of the roller reduces the chance of binding. Fixing the shaft in the axial direction relative to the mounting assemblies also allows the tie-rod to be eliminated thereby improving the reliability and performance of the apparatus. The fixed relationship between the shaft and the mounting assemblies also allows the ends of the shaft to be supported closer to the roller. This decreases shaft deflection under load which increases the bearing life of the roller. The arm of the pivot bracket allows the contact force between the belt and roller to be better absorbed so that the force may be properly transmitted to the support member and conveyor frame.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An apparatus for aligning a conveyor belt during rotation of the conveyor belt, the apparatus comprising:
    a shaft having a first end, a second end and a central axis extending from the first end to the second end;
    a first mounting assembly and a second mounting assembly, the first end of the shaft attached to the first mounting assembly and the second end attached to the second mounting assembly, the shaft being fixed axially relative to the first and second mounting assemblies;
    a first pivot bracket and a second pivot bracket, the first mounting assembly pivotally connected to the first pivot bracket and the second mounting assembly pivotally connected to the second pivot bracket; and
    a first guide roller and a second guide roller for engaging the conveyor belt upon misalignment of the conveyor belt, the first guide roller attached to the first pivot bracket and the second guide roller attached to the second pivot bracket.

2. The apparatus as set forth in claim 1 wherein the shaft comprises a detent to axially fix the shaft relative to the first and second mounting assemblies.

3. The apparatus as set forth in claim 2 wherein the first mounting assembly and/or the second mounting assembly abuts a wall of the detent to axially fix the shaft relative to the first and second mounting assemblies.

4. The apparatus as set forth in claim 2 wherein the detent has a width and the first mounting assembly and/or the second mounting assembly has a main housing and a face plate attached to the housing, the face plate having a width substantially equal to the width of the detent to axially fix the shaft relative to the first and second mounting assemblies.

5. The apparatus as set forth in claim 1 further comprising a first pin that extends into the first mounting assembly and a second pin that extends into the second mounting assembly, the first pin and second pin being orthogonal to the shaft; and wherein the first mounting assembly includes a first bushing for rotation of the first pin relative to the first mounting assembly, the first pin being received in the first bushing, and the second mounting assembly includes a second bushing for rotation of the second pin relative to the second mounting assembly, the second pin being received in the second mounting assembly bushing.

6. The apparatus as set forth in claim 5 wherein the first bushing defines a first upper bushing and the second bushing defines a second upper bushing, the first mounting assembly further comprising a first lower bushing and the second mounting assembly further comprising a second lower bushing, the first pin being received in the first lower bushing and the second pin being received in the second lower bushing.

7. The apparatus as set forth in claim 5 wherein each mounting assembly has a top wall and bottom wall, the pin extending from the top wall to the bottom wall.

8. The apparatus as set forth in claim 5 wherein the first pin is fixed to the first pivot bracket and the second pin is fixed to the second pivot bracket.

9. The apparatus as set forth in claim 1 wherein the first and second pivot brackets are pivotally connected to a support member.

10. The apparatus as set forth in claim 9 further comprising a first support mount attached to the support member and a second support mount attached to the support member, the first pivot bracket being pivotally attached to the first support mount and the second pivot bracket being pivotally attached to the second support mount.

11. The apparatus as set forth in claim 9 comprising a first frame bracket and a second frame bracket attached to the support member for connecting the apparatus to a frame of the conveyor belt.

12. The apparatus as set forth in claim 1 wherein each pivot bracket has a frame and an arm attached to the frame, the frame and arm both being pivotally attached to a corresponding support mount.

13. The apparatus as set forth in claim 12 wherein each frame and arm are connected by a support mount pin and each support mount comprises a support mount upper bushing and a support mount lower bushing, the support mount pin being received in the support mount upper bushing and the support mount lower bushing.

14. The apparatus as set forth in claim 12 wherein each pivot bracket frame has a lower portion and an upper portion, the lower portion being attached to a guide roller and the upper portion being connected to a support mount.

15. The apparatus as set forth in claim 1 wherein the shaft is rotatably fixed to the first mounting assembly and the second mounting assembly.

16. The apparatus as set forth in claim 15 wherein the shaft comprises a detent to prevent rotation of the shaft.

17. The apparatus as set forth in claim 15 wherein the first mounting assembly and/or the second mounting assembly comprise a mounting assembly opening for receiving the shaft, the mounting assembly opening have a linear portion to prevent rotation of the shaft.

18. The apparatus as set forth in claim 1 wherein each mounting assembly has a main housing and a face plate attached to the housing, the face plate having a mounting assembly opening, the shaft extending through the mounting assembly opening.

19. The apparatus as set forth in claim 1 wherein the first guide roller, first pivot bracket, first mounting assembly, shaft, second mounting assembly, second pivot bracket and second guide roller form a conveyor belt response chain, the chain being the only operable connection between the first guide roller and the second guide roller.

20. The apparatus as set forth in claim 1 wherein the apparatus does not include a tie rod connecting the first guide roller to the second guide roller.

21. The apparatus as set forth in claim 1 comprising a roller for engaging the conveyor belt, the roller being rotatable around the shaft.

\* \* \* \* \*